United States Patent [19]

Kanno et al.

[11] Patent Number: 5,388,234
[45] Date of Patent: Feb. 7, 1995

[54] FINITE STATE AUTOMATION TEXT SEARCH APPARATUS HAVING TWO-LEVEL MEMORY STRUCTURE

[75] Inventors: Yuji Kanno, Kawasaki; Masao Ito, Tokyo; Ken Tsurubayashi, Tokyo; Kazuaki Kurachi, Tokyo; Atsushi Ando, Yokohama, all of Japan

[73] Assignee: Matsushita Electric Industrial Co., Ltd., Osaka, Japan

[21] Appl. No.: 77,585

[22] Filed: Jun. 17, 1993

[30] Foreign Application Priority Data

Jun. 19, 1992 [JP] Japan .................................. 4-161520

[51] Int. Cl.[6] .............................................. G06F 11/30
[52] U.S. Cl. .................................... 395/375; 395/600; 364/956.0; 364/955.5; 364/DIG. 1; 364/DIG. 2
[58] Field of Search .............................. 395/375, 600; 364/255.2, 955.5, 956, 254, 253

[56] References Cited

U.S. PATENT DOCUMENTS

| | | |
|---|---|---|
| 4,241,402 | 12/1980 | Mayper, Jr. et al. |
| 4,285,049 | 8/1981 | Bird et al. |
| 4,764,863 | 8/1988 | Silverthorn, III et al. ......... 395/575 |
| 4,985,863 | 1/1991 | Fujisawa et al. .................... 395/600 |
| 5,051,886 | 9/1991 | Kawaguchi et al. ............. 364/253.1 |
| 5,212,697 | 5/1993 | Morita ................................ 371/68.1 |

OTHER PUBLICATIONS

Searching for a Minimal Finite State Automation (FSA), IEEE 1991 publication pp. 416-423.
"ACCESS METHODS FOR TEXT" by C. Faloutsos; Computing Surveys, vol. 17, No. 1, Mar 1985.
"TEST SEARCHING PROCESSOR"; Dec. 1991 (w/ partial English translation).

Primary Examiner—Parshotam S. Lall
Assistant Examiner—Zarni Maung
Attorney, Agent, or Firm—Lowe, Price, LeBlanc & Becker

[57] ABSTRACT

A finite state automaton (FSA) text search apparatus converts each of successively received binary code numbers, representing successive characters of a text to be searched, into two portions. Two portions are extracted from a state number which is currently being read out from a first table memory, with one portion being combined with one of the input character portions and the combination used to select one of a set of 1st displacement numbers from a second table memory, while a second portion of the current state number and the other portion of the input character number similarly select one of a set of 2nd displacement numbers from a third table memory, and the entire current state number selects one of a set of base numbers from a fourth table memory. The selected 1st and 2nd displacement numbers are combined with the selected base number, and the result used to select the next state number from the first table memory. The overall memory capacity required is minimized, while achieving a high search speed.

11 Claims, 11 Drawing Sheets

FIG. 4 PRIOR ART

| | INPUT CHARACTER | NEXT STATE | |
|---|---|---|---|
| | ⋮ | ⋮ | |
| BASE ADDRESS S'0 → | C | S1 | ⎫ TABLE MEMORY SECTION FOR S0 STATE |
| | D | S2 | |
| | OTHER | S0 | ⎭ |
| | | | |
| | | | |
| BASE ADDRESS S'1 → | A | S3 | ⎫ FOR S1 STATE |
| | OTHER | S0 | ⎭ |
| | | | |
| BASE ADDRESS S'3 → | T | S5 | → "QUERY SUCCESS" STATE |
| | OTHER | S0 | |
| | | | |
| | | | |
| BASE ADDRESS S'2 → | O | S4 | ⎫ FOR S2 STATE |
| | OTHER | S0 | ⎭ |
| | ⋮ | ⋮ | |

FIG. 6
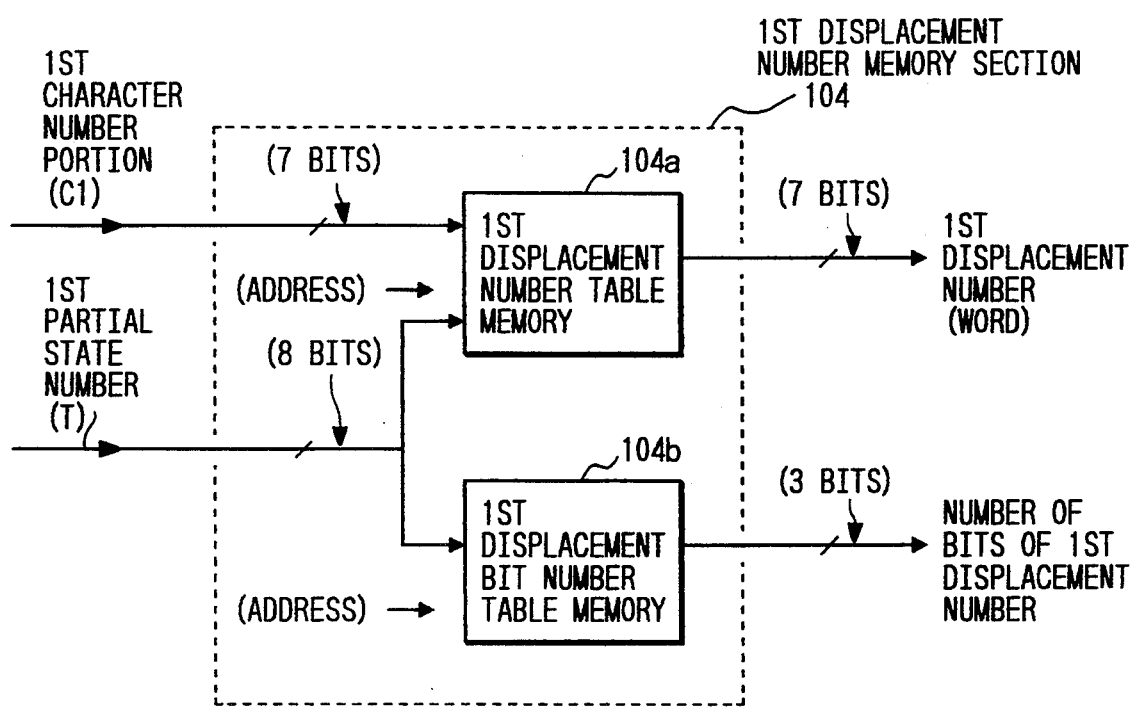
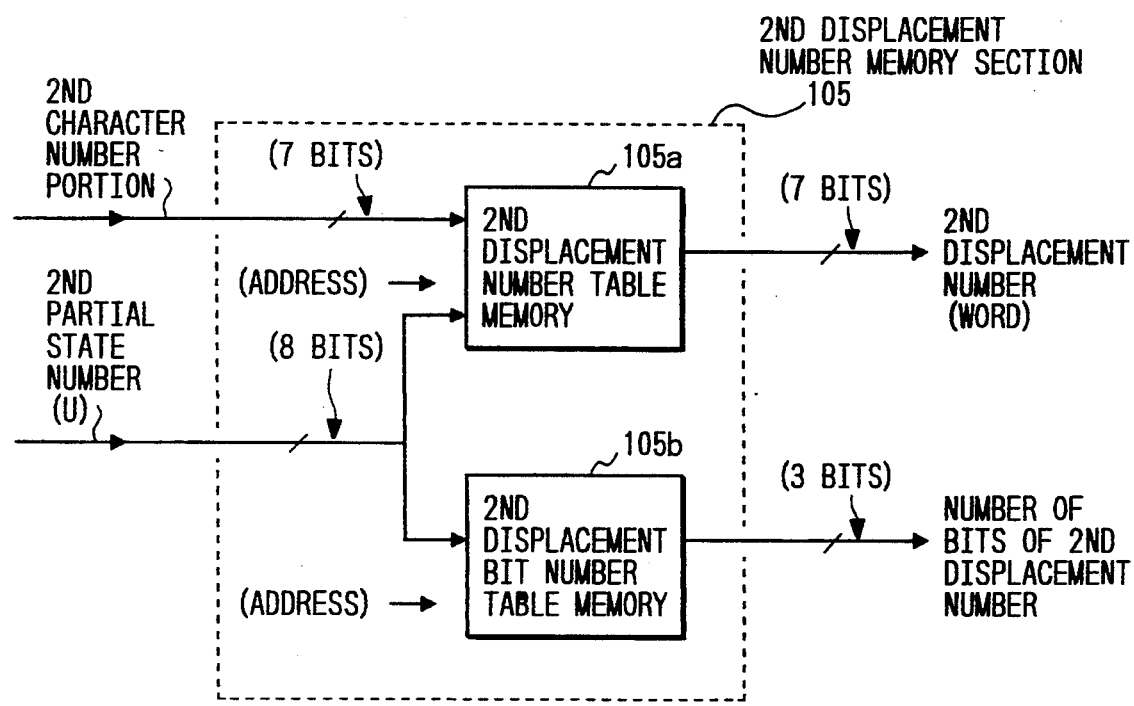

FINITE STATE AUTOMATION TEXT SEARCH APPARATUS HAVING TWO-LEVEL MEMORY STRUCTURE

BACKGROUND OF THE INVENTION

1. Field of Applicable Technology

The present invention relates to an apparatus based on a finite state automaton, (hereinafter abbreviated to FSA) for scanning successive characters of a text to detect specified strings of characters or other specified patterns in the text.

2. Description of the Related Art

In recent years, with the widespread use of word processors and text databases, various techniques have been developed for searching through a stored text in order to access a desired portion of the text, or to find one or more specified character strings or other specified patterns within the text. One prior art method involves the use of key words, in which respective positions of documents or document portions within the stored text are represented by corresponding key words which are known to appear in the documents or document portions. The key words, and information indicating their positions within the text, are held in a register. Thus, a user can institute an operation to search for and read out a desired portion of the text, by inputting the correct key word. However such a method has various disadvantages, such as the work which is necessary to assign and store the key words, the increased storage capacity that is required due to the need to provide the key word register, and also the possibility of errors or delays resulting if a user uses an incorrect key word or misspells a key word.

For such reasons, a type of search referred to as a full-text search or full-text scan has received attention as an efficient technique for searching through a stored text. With a full-text search method, if for example a specific character string is to be located within the text, or if a part of the text is to be located and read out, which is known to contain any specific character string (e.g. in a header portion), then the only information which is required by the user to institute the search is that character string itself. The search is executed by successively reading out each character (represented as a binary code number) from memory, starting from the head of the text or the head of a specified part of the text, to detect the sequence of characters constituting the specified string. Successive characters of the text are stored in sequentially numbered addresses of the text memory, starting from the head of the text, so that when the specified string is detected, the position of that string within the text is known. Information such as the position of the specified string, or a portion of the text which follows the specified string, can thus be provided to the user.

The term "character" as used herein applies not only to alphanumeric or other characters, but also to punctuation symbols such as commas, and inter-word spaces, which are also expressed by respective binary code values.

With a full-text search method, a user is not restricted only to searching for specific character strings, but can also specify a combination of search conditions, and can request that only a portion of the text which satisfies all of the search conditions is to be searched for. In the case of a newspaper database for example, an example of such search conditions might be: Find a newspaper article for which the header of the article contains the word "Russia" or "Soviet" while the body of the article contains the word "Gorbachev" or "Gorbie", and the field code for the article does not contain the designation "economics".

With a full-text search apparatus, it is possible to search for a pattern, rather than for a specific string. Such a pattern may be expressed in a so-called "regular expression" for example so that a command can be supplied to the search apparatus which is of the form:

Find a part of the text which matches the search condition "a[ , .]* g".

The apparatus would respond by finding a pattern in the text such that the character "a" is immediately followed by zero or more characters, which is neither a comma nor a period, with that character (or characters) being immediately followed by the character "g". Such a condition would for example be satisfied by any of the strings "acting", "adopting", etc.

Such full-text searching is applicable not only to large-scale databases, but also to editing operations with a word-processor, for example to search through a text to find misspelled words. Full-text searching can be applied advantageously to text in various languages other than European languages, for example to Japanese or Chinese.

However full-text search has had the disadvantage in the prior art that, since it is necessary to successively examine each of the characters of a text in order to find a character string or pattern which satisfies predetermined conditions, a relatively long time is required to execute a search, by comparison with a method using key words. Various proposals have been made in the prior art for techniques and algorithms to reduce that disadvantage. Some of these are summarized for example in "Access Methods for Text", by Christos Faloutsos, Computing Surveys, Vol. 17, No. 1, March 1985, and in an article "Text Searching Processor", published in a document by the Institute of Electronics, Information and Communication Engineers (EIC) Japan, December 1991, ISBN4-88552-103-3.

The present invention is concerned with a full-text search apparatus which is based on a Finite State Automaton (hereinafter referred to as FSA). Use of a FSA has advantages such as enabling a number of different character strings or patterns to be searched for at the same time, during a single pass through the text which is searched. In addition, the technique is very suitable for application to the use of regular expression search commands for designating strings or patterns that are to be matched, such as the "a[ , .]* g" example given above.

FIG. 2 illustrates the basic principles of a finite state automaton search apparatus which utilizes the finite state automaton technique. Prior to executing a search, a state number table is initialized by setting therein a set of numbers, referred to as state numbers, which correspond to respectively different states of a search operation, with specific relationships between the values of state numbers and the addresses (i.e. table entry locations) at which they are set. During the search operation, text characters (expressed as respective binary code values, referred to in the following as character numbers) are sequentially supplied to the apparatus, starting from the head of the text, with each character number being supplied during a fixed interval. During that interval, the character number is combined with a state number which has been read out from the state number table immediately previously, to obtain the address of the next state number.

FIG. 3 illustrates a text search example, whereby the two character strings "CAT" and "DOG" are to be searched for simultaneously. The symbol " " before a character signifies "not". There are six states, having respectively different state numbers assigned thereto. S0 denotes an initial search state, which is the default state. Prior to the search, the state number table shown in FIG. 2 is initialized in accordance with the search conditions, for example such that the state number S1 is set at a table entry whose address is a combination of the state number S0 and the character number for "C", and the state number S5 is set at a table entry whose address is a combination of the state number S3 and the character number for "T", and also at an entry whose address is a combination of state number S4 and the character number for "G".

The portion of the state number table in FIG. 2 containing the respective sets of "next state" numbers for transitions from each state in this example is illustrated in Table 1 below.

TABLE 1

| S4 | S0 | S0 | S0 | S0 | S0 | S0 | S5... | S0... | S0 | S0 | S0 | S0 | S0 | S0 | S0 |
|----|----|----|----|----|----|----|----|----|----|----|----|----|----|----|----|
| S3 | S0 | S0 | S0 | S0 | S0 | S0 | S0... | S0... | S5 | S0 | S0 | S0 | S0 | S0 | S0 |
| S2 | S0 | S0 | S0 | S0 | S0 | S0 | S0... | S4... | S0 | S0 | S0 | S0 | S0 | S0 | S0 |
| S1 | S3 | S0 | S0 | S0 | S0 | S0 | S0... | S0... | S0 | S0 | S0 | S0 | S0 | S0 | S0 |
| S0 | S0 | S0 | S1 | S2 | S0 | S0 | S0... | S0... | S0 | S0 | S0 | S0 | S0 | S0 | S0 |
|    | A  | B  | C  | D  | E  | F  | G... | O... | T  | U  | V  | W  | X  | Y  | Z  |

The search operation is performed as follows. Initially, the character number C0 is generated as the current state number, and in that condition, the first character number of the text is supplied, to obtain an address for the state number table. If the first character is any other character than "C" or "D", then the address that is generated will be that of the default state number S0, which is then read out from the state number table as the next state number. That state number is then supplied as the current state number, to be combined with the next character number of the text to obtain a new address. If the next character is for example "C" then the table location of state number S1 will now be specified, and that state number will be read out as the next state number.

Any next state number to which a transition (other than a default transition) can occur from the current state number, will be referred to in the following as a "success state number" with respect to the current state number. An input character which results in a transition to a success state number will be referred to as a success transition character with respect to the current state number, (as opposed to a default transition character).

The above operations are successively performed until the "final success" state S5 is reached, i.e. until the state number S5 is read out from the state number table, indicating that the string "CAT" or "DOG" is found. In such a search, the state of the search operation at any point in the search is dependent upon a sequence of previous states. The search operation can be continued until all of the text characters have been examined, or the operation can, for example, be controlled such that the search is halted when the "final success" state number is read out.

It can be seen from Table 1 above, the state number table contains a large number of default (S0) entries, and only a few of the success state number entries. For example in the state S1, if the input text character is any other then "A, then it is necessary that the state number S0 be read out from the state number table, i.e. it is necessary to provide respective S0 table entries for the complete range of characters other than character "A". Thus there will be a very large number of default state (S0) entries in the state number table. For simplicity, only the set of 26 upper-case alphabetic characters are shown in Table 1 above, and it can be understood that with a complete alphanumeric character set for example, the actual number of S0 table entries in the complete state number table would be considerably greater.

It will thus be clear that the greater the range of characters in the character set, the greater will be the amount of storage capacity required to implement the state number table, i.e. as a state number table memory.

FIG. 1 is a general block diagram of an example of such a prior art type of full-text search apparatus utilizing the finite state automaton technique. The text that is to be searched is stored beforehand as a set of character numbers in an input text memory 301, which can be a RAM or disk storage device, with the character numbers held in respective numbered locations. Numeral 302 denotes a state number table memory, which implements the state number table of FIG. 2 described above, and can be configured from a RAM. Part of the bits of each address of the state number table memory 302 are constituted by the character number that is currently being read out from the input text memory 301, while the remaining address bits are constituted by the current state number, which is being read out from a transition state number register 303. An operation number table memory 304 receives the current state number from the transition state number register 303 as an address, and serves to generate a corresponding operation number, which is supplied to a search control system (e.g. based on a CPU, not shown in the drawing) which functions in response to the search results to perform various control operations. The search control system might for example halt a text search when a specific operation number is outputted from the operation number table memory 304, and/or store the current address value of the input text memory 301, indicative of the search position that has been reached in the text.

The operation of the apparatus of FIG. 1 is in accordance with the basic operation described above referring to FIG. 2. Prior to beginning a search, the text characters are successively written into the input text memory 301, and the contents of the state number table memory 302 are initialized in accordance with the required search conditions. In addition, the contents of the operation number table memory 304 are initialized such that operation numbers which will be recognized by the search control system as expressing respective known statuses of the text search will be read out from the transition state number register 303. During the search operation, the text character numbers are successively read out from the input text memory 301 in sequential time intervals. During each of these intervals, the address formed by the bits of the current character number and the current state number is supplied to the state number table memory 302, to thereby read out the next state number, which is held in the transition state number register 303 until the start of the succeeding interval and is then read out to become the current state number. These operations are successively executed, until the end of the text is reached or the search control system detects a specific operation number and halts the search.

With such a search apparatus, the range of possible character numbers might for example be from 0 to 65,535, while the range of state numbers could be from 0 to 8191. If it is assumed that the state number table memory 302 has 29 address bits, then the low-order 13 bits of these could be constituted by the bits of the current state number, and the high-order 16 address bits could be constituted by the bits of the current character number. Such a FSA search apparatus is described for example in the aforementioned Japanese reference document "Text Searching Processor".

However, such a prior art FSA type of full-text search apparatus has the disadvantage of requiring a large amount of capacity for the state number table memory. This is especially true in the case of a text search apparatus which operates on characters such as Japanese characters, which have a very wide range. If the character range is as high as 0 to 65,535, and if there are 8192 possible different values for the state numbers which are held in the state number table memory 302, then it becomes necessary to store more than 500 million words in the state number table memory 302. This makes it difficult for the above type of FSA search apparatus to be applied to a character set having a wide range, in which each character is expressed by a large number of binary code bits.

One method which has been proposed in the prior art for overcoming the above disadvantage is to form the state number table memory with respective table sections which are assigned to the various states, for example as illustrated in FIG. 4. Each word in the table memory consists of a combination of a character number and a state number. Each table section consists of at least two of such words, with one word being for the default state (defined hereinabove), designated in FIG. 4 as S0. In each of these table sections, the address of one of the words is designated as the base address of that table section. During a text search operation, if for example the S0 state number has been determined to be the next state number, with the base address of the S0 table section (shown as S0') being supplied to the table memory, then the character number for "C" and the state number S1 would be read out from the table memory. The character number "C" is then compared with the current text character. If they are identical, then the base address for the S1 state (S1') is generated, and the character number "A" is then read out and compared with the succeeding text character. If however the current text character number is not identical to "C", then that character number is compared with that of "D". If coincidence is not found, i.e. the current text character is any character other than "C" or "D", then the base address of the default state S0 is again generated, and the above process repeated for the succeeding text character.

It can be understood that with such a system, it becomes unnecessary to store the default (S0) state number at a large number of locations in the state number table memory. Thus the required memory capacity is greatly reduced, by comparison with the direct addressing technique of FIG. 1. However such a method has the disadvantage that it is necessary to execute successive comparisons between each input text character and the contents of a table section. Thus the speed of searching is significantly reduced, which is a severe disadvantage when a large volume of text has to be searched.

To overcome that problem of the time required for sequential comparisons, a finite state automaton full-text search method has been described in U.S. Pat. No. 4,285,049, whereby each word in the state number table memory, corresponding to one specific state, is a "state word", which is a combination of a base number and a set of indexing bits. The number of indexing bits is identical to the number of bits constituting each input character number, so that for an 8-bit byte character number a set of 256 index bits would be required. Hence the embodiment uses sequential 4-bit nibbles for text character input, to enable the number of indexing bits to be limited to 16. All of the indexing bits are set in the '0' state, except for one or more bits which respectively correspond to the success transition character or characters, and which are each in the '1' state. During the search operation, when such a state word has been read out from the state number table memory, a judgement is made as to whether the current input character corresponds to any of the '1' state index bits. If so, then a numeric value, derived from the position of that '1' state index bit, is added to the base number of that state word, to obtain the address of the next state word.

Such a method however has the disadvantage that, in practice, the number of bits constituting a character number must be no greater than 4. Hence it is necessary to process an 8-bit character number as two 4-bit nibbles which are processed sequentially (with a judgment then being made as to whether both of the nibbles match those of a specific transition character). Thus, the search speed is reduced due to such sequential processing, and that problem would be made more severe in the case of characters such as Japanese characters which are expressed by 16-bit character numbers.

SUMMARY OF THE INVENTION

It is an objective of the present invention to overcome the disadvantages of prior art types of FSA text search apparatus, by providing a FSA text search apparatus whereby not only are the total memory capacity requirements minimized, but also rapid searching can be executed of a text formed of characters which have a wide range, and so are expressed by character numbers having a large number of bits.

To achieve the above objectives, a FSA text search apparatus according to the present invention utilizes a two-stage memory configuration, having a first memory stage which receives an address derived on the basis of the input character number that is currently being supplied to the apparatus and the state number which is currently being read out from a state number table memory, which constitutes a second memory stage. Information read out from the first memory stage is utilized in generating an address, in the state number table memory, of the next state number that is to be read out therefrom. That address is subsequently supplied to the state number table memory, to thereby read out the next state number.

The first memory stage consists of a table memory from which is read out a base number that is determined by the current state number, a table memory from which is read out one of a set of numbers referred to as "1st displacement number", determined in accordance with one of the portions of the input character number and a portion of the current state number, and a table memory from which is read out one of a set of numbers referred to as "2nd displacement numbers", determined in accordance with the other portion of the input character number and another portion of the current state number. The 1st and 2nd displacement numbers thus obtained are combined and the result is added to the base number, to obtain the address of the next state number in the state number table memory.

Specifically, in the first memory stage:

(a) a base number is obtained whose value depends only on the current state, and, (b) a combination of two displacement numbers is obtained, which combination specifies one out of a plurality of possible transitions from the current state.

In general, the displacement number combination specifies the transition as being either to one out of a small number of success states, or to a default state. Thus the displacement numbers can each consist of only a small number of bits.

The above basic configuration is utilized in both a first and a second embodiment of the invention as described hereinafter. However with the second embodiment, a part of the base number table memory is reserved for character numbers rather than base numbers. When a character number is read out from that part of the base number table memory in response to the current state number, it is compared with the current input character number. One of two possible addresses for the next state number is then generated, in accordance with whether or not the character numbers are identical. Such operation is applicable to a state from which only two transitions are possible (i.e. a success and a default transition) and reduces the number of words which must be stored in the state number table memory. An even greater reduction of memory requirements can thereby be achieved.

More specifically, according to a first aspect, the present invention provides a finite state automaton text search apparatus responsive to sequentially supplied input character numbers expressing successive characters of a text for executing a search of the text in accordance with predetermined search conditions, comprising:

state number table memory means having stored therein a plurality of state numbers, at respective addresses predetermined in accordance with the search conditions;

character number conversion means for converting a current input character number into first and second character number portions;

state number address derivation means for selecting one of a predetermined set of 1st displacement numbers, in accordance with a combination of the first character number portion and a first portion of a current state number which is being produced from the state number table memory means, selecting one of a predetermined set of 2nd displacement numbers, in accordance with a combination of the second character number portion and a second portion of the current state number, selecting one of a predetermined set of base numbers in accordance with the current state number, combining the selected 1st and 2nd displacement numbers to form a combined displacement number, and adding the combined displacement number to the selected base number to obtain an address in the state number table memory means of a next state number; and address register means coupled to receive the address of the next state number, controlled to supply that address to the state number table memory means when a next one of the input character numbers is received by the search apparatus.

With such an apparatus, respective relationships between the sets of 1st and 2nd displacement numbers and the state number and character number portions are predetermined in accordance with the search conditions, such that the combined displacement number (derived based on the two portions of the input character number in conjunction with two portions of the current state number) is indicative of one specific transition from the current state of the text search, i.e. a transition that is determined by the input character number.

In general, each of the state numbers, character numbers, base numbers and displacement numbers will be a binary number, and the address derivation means comprises:

base number table memory means having stored therein a plurality of the base numbers at respective addresses determined in accordance with the search conditions, and responsive to the current state number for reading out a corresponding base number;

1st displacement number table memory means having stored therein a set of 1st displacement number words, responsive to a combination of the first portion of the current state number and the first portion of the input character number for reading out one of the 1st displacement number words;

1st displacement bit number table memory means having stored therein a set of values of 1st displacement bit numbers, responsive to the first portion of the current state number for reading out one of the values of 1st displacement bit number;

second displacement number table memory means having stored therein a set of 2nd displacement number words, responsive to a combination of the second portion of the current state number and the second portion of the input character number for reading out one of the 2nd displacement number words;

2nd displacement bit number table memory means having stored therein a plurality of values of 2nd displacement bit number, responsive to the second portion of the current state number for reading out one of the 2nd displacement number values; and address generating means coupled to receive the 1st and 2nd displacement number words and 1st and 2nd displacement bit number values read out from the 1st and 2nd displacement number table memories and 1st and 2nd displacement bit number table memories respectively, for extracting a 1st displacement number from the 1st displacement number word as a set of bits equal in number to the 1st displacement bit number value, for extracting a 2nd displacement number from the 2nd displacement number word, as a set of bits equal in number to the 2nd displacement bit number value, for multiplying the 2nd displacement number by an amount $2^n$ where "n" signifies the 1st bit number value and adding a result obtained thereby to the 1st displacement number to obtain the combined displacement number, and for adding the combined displacement number to the base number to obtain the address of the next state number.

According to another aspect of the invention, if the apparatus is applied to text characters which are each formed of a pair of binary code values, with each of the binary code values expressing a number within a range of values which extend from a value higher than zero, then the character number conversion means preferably converts the binary code values of an input character number to respective converted code values and supplies the converted code values to the address derivation means as the first and second character number portions respectively, each of the converted code values being within a range of values extending from zero. The number of bits required to express each character number portion can thereby be minimized.

According to another aspect, the apparatus also includes operation number table memory means having stored therein a plurality of operation numbers respectively predetermined as representing respective statuses of the search, the operation numbers stored at respective addresses predetermined in accordance with the search conditions, the operation number table memory means being responsive to the current state number for reading out a corresponding one of the operation numbers.

The invention further provides a finite state automaton text search apparatus for searching a text in accordance with predetermined search conditions, coupled to receive successive input character numbers expressing respective characters of the text, comprising:

state number table memory means having stored therein a plurality of state numbers, at respective addresses determined in accordance with the search conditions;

character number conversion means for converting an input character number into first and second input character number portions;

base number and character number table memory means having a plurality of base numbers held at respective addresses within a first address range and a plurality of stored character numbers held at respective addresses within a second address range, each of the stored character numbers being a success transition character number with respect to a specific state number, and being held in the base number and character number table memory means at an address which is identical to the specific state number;

first state number address derivation means for deriving an address of a next state number in the state number table memory means in accordance with a current input character number and a base number read out from the base number and character number table memory means when the current state number is within the first address range, and second state number address derivation means for deriving the address of a next state number in accordance with a character number read out from the base number and character number table memory means when the current state number is within the second address range; and address register means coupled to receive the address of the next state number, controlled to supply the address to the state number table memory means when a succeeding one of the input characters is supplied to the apparatus.

BRIEF DESCRIPTION OF THE DRAWINGS

FIG. 4 is an example of a portion of the contents of a state number table memory used in another type of prior art FSA text search apparatus;

FIG. 6 is a block diagram of internal configurations of displacement number memory sections used in the embodiment of FIG. 5;

DESCRIPTION OF PREFERRED EMBODIMENTS

Figure 5:
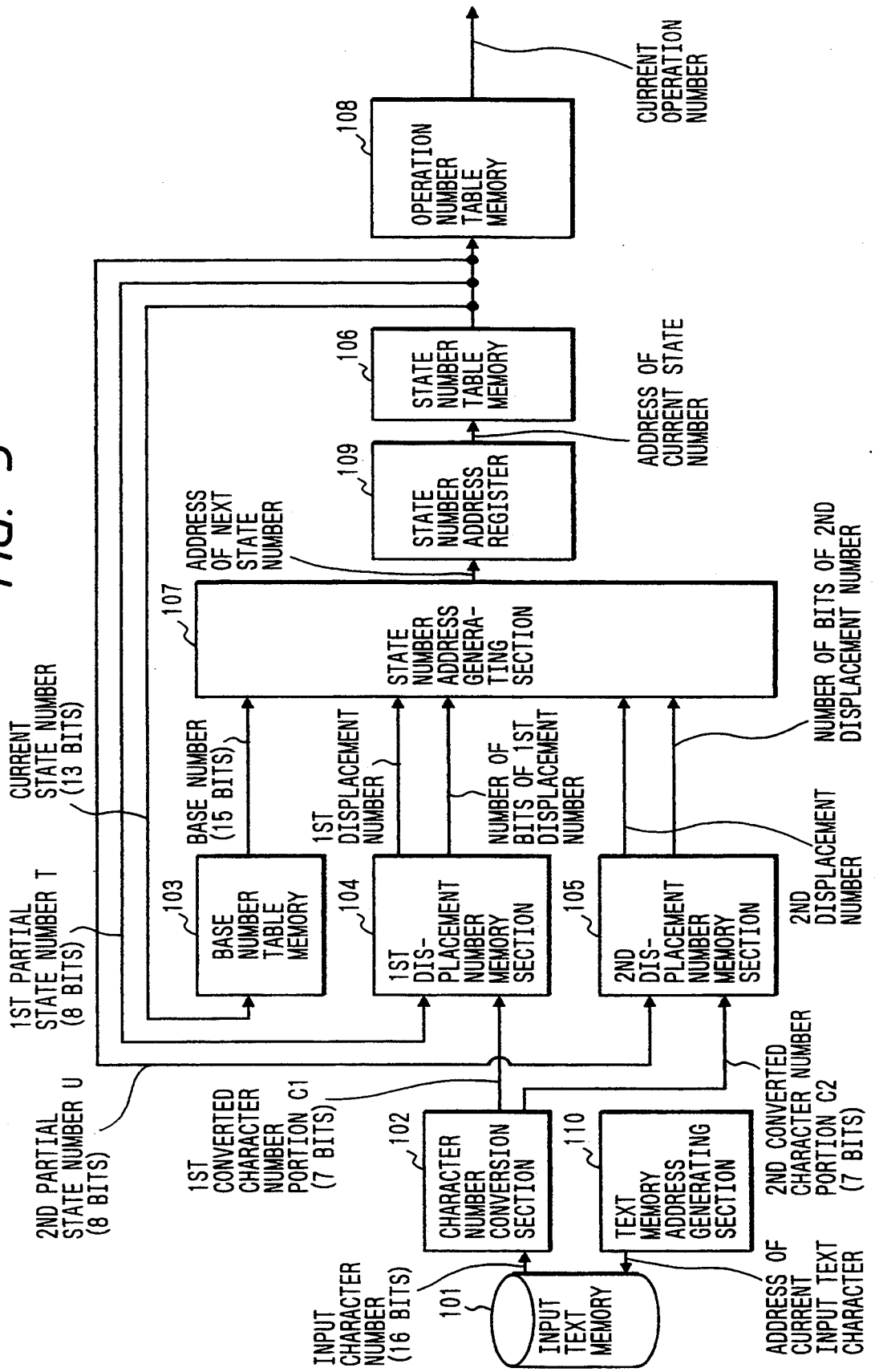
FIG. 5 is a general block diagram of a first embodiment of a FSA text search apparatus according to the present invention.

FIG. 5 is a general block diagram of a first embodiment of a FSA text search apparatus according to the present invention. An input text memory 101 stores a text which is to be searched, with the text characters in this embodiment being expressed as respective pairs of binary code values (the pairs being referred to herein as character numbers), and with the character numbers stored in successively numbered addresses of the input text memory 101. The addresses of these character numbers are successively supplied to the input text memory 101 from a text memory address generating section 110, in respective character examination intervals. This embodiment is applicable to Japanese characters which are respectively expressed by 16-bit EUC binary code character numbers, i.e. each character expressed by a low-order and a high-order byte each of which is in the range 138 to 254. For that reason, in order to minimize memory storage capacity requirements, each of these bytes is converted to a zero-based 7-bit binary number by subtracting 138, in a character number conversion section 102, i.e. to convert the high-order byte of the character number to a 7-bit first converted character number portion designated herein as C1, and the low-order byte of the character number to a 7-bit second converted character number portion designated as C2. A base number table memory 103 has stored therein a set of 15-bit words, referred to as base numbers, and receives as address bits a 13-bit current state number (produced as described hereinafter). A 1st displacement number memory section 104 is formed of two table memories, as shown in FIG. 6. One of these, designated as 1st displacement number table memory 104a, stores a set of 7-bit words, referred to as 1st displacement number words. The other, designated as 1st displacement bit number table memory 104b, stores a set of 3-bit numeric values which express, for each state, the number of bits of a corresponding 1st displacement number (where the term "number of bits", as used here, is defined hereinafter), as a value in the range 0 to 7. The term "1st displacement number" signifies one of a set of numbers collectively designated as the "1st displacement numbers". The term "2nd displacement number" is similarly utilized. The displacement number table memory 104a has 15 address lines and receives a portion (designated herein as the first partial state number T) of the bits constituting the current state number as the 8 high-order bits of the 15-bit address, and receives the first converted character number portion C1 as the 7 low-order bits of that address. The table memory section 104b has received the 8-bit first partial state T number as input address. Similarly, a 2nd displacement number memory section 105 is formed of two table memories, 105a, 105b. The 2nd displacement number table memory 105a stores a set of 7-bit words, referred to as 2nd displacement number words. The 2nd displacement bit number table memory 104b stores a set of 3-bit numeric values which express, for each state, the number of bits of a corresponding 2nd displacement number, as a value in the range 0 to 7. The displacement number table memory section 105a has 15 address lines and receives a portion (designated as the second partial state number U) of the bits constituting the current state number, as the 8 high-order bits of the 15-bit address, and receives the second converted character number portion C2 as the 7 low-order bits of that address. The table memory section 105b receives the second partial state number U as input address.

The 15-bit base number from table memory 103, a 7-bit word read from table memory 104a, a 3-bit word expressing the number of bits of the 1st displacement number, (from table memory 104b), a 7-bit word read from table memory 105a, and a 3-bit word expressing the number of bits of the 2nd displacement number, (from table memory 105b) are each supplied to a state number address generating section 107, which operates on these input values to calculate the (15 bit) address of the next state number that is to be read out from a state number table memory 106. That address value is first set into a state number address register 109, to be subsequently supplied (as the address of the current state number) to the state number table memory 106 in a succeeding time interval when the next input character number is being supplied from the input text memory 101. In this embodiment, the state number table memory 106 has a total of 32,768 state numbers stored therein, each state number being formed of 13 bits, and with the state numbers values being in the range 0 to 8191. The state number table memory 106 can be considered as a 1 dimensional table memory, with each address value supplied thereto being derived by adding a displacement amount to a base value, as described hereinafter. The state numbers are stored in the state number table memory 106 at respective addresses which are predetermined (during initialization) in accordance with the required conditions for searching the input text.

An operation number table memory 108 generates operation numbers in response to respectively predetermined ones of the state numbers produced from the table memory 106, these operation numbers having respective predetermined significances for indicating statuses of the text search. These operation numbers are supplied to an external system such as a control system (not shown in the drawings) which executes overall control of the apparatus shown in FIG. 5. The control system can thereby respond to certain operation numbers by executing operations such as halting a text search, etc.

Prior to beginning a search operation, the input text (where "input text" can signify an entire text or a selected portion) which is to be searched through is written into the input text memory 101 as a sequence of character numbers, with sequential addresses in memory 101 assigned to the character numbers of successive characters, starting from the head of the text. The contents of the base number table memory 103, 1st displacement number memory section 104, 2nd displacement number memory section 105, state number table memory 106 and operation number table memory 108 are initialized, by arranging their respective contents in accordance with the desired search conditions. After completion of initialization, when a text search is initiated the text memory address generating section 110 generates the address of the character number which is at the head of the text stored in the input text memory 101, and a default state number (which is fixedly predetermined) is transferred onto the output lines of the state number table memory 106 as the first current state number. Various methods of generating that initial current state number can be envisaged, and so specific description is omitted. The high-order and low-order bytes of the first input character number are converted by the character number conversion section 102 to respective 7-bit numbers (each having a value in the range 0 to 116), referred to in the following as the first and second converted character number portions respectively. The first and second converted character number portions are applied as the low-order 7 bits of the addresses of the 1st displacement number table memory 104a and the 2nd displacement number table memory 105a respectively.

In the following, the bits of a binary number will be designated, successively from the LSB, as bit 0, bit 1, bit 2, bit 3, etc. In this embodiment, the first partial state number (T) consists of the bits 1, 2, 3, 4, 9, 10, 11 and 12 of the current state number which is being read out from the state number table memory 106. The second partial state number (U) consists of the bits 5, 6, 7, 8, 9, 10, 11 and 12 of the current state number. More specifically, the respective values of the first partial state number T and of the second partial state number U, (designating the current state number from which these are obtained as S) can be expressed as follows:

$$T = (((S - (S \bmod 2))/2) \bmod 16) + ((S - (S \bmod 512))/512) * 16$$

$$U = (S - (S \bmod 32))/32$$

In the above, "*" denotes multiplication.

It should be noted that if two identical sets of bits extracted from the current state number were to be utilized in obtaining the first and second displacement numbers, rather than the respectively different sets T and U of this embodiment, then there would be a reduction in the number of different state numbers for which each displacement number can be used in obtaining the address of the next state number. That is to say, if T and U were to be identical (e.g. both being the 8 high-order bits of the current state number), then the corresponding sets of 1st and 2nd displacement numbers could be used for only one of the various state numbers which have the same specific set of 8 high-order bits. That point will be made more clear in the description of a specific numeric example, given hereinafter referring to FIG. 10.

Figure 8:
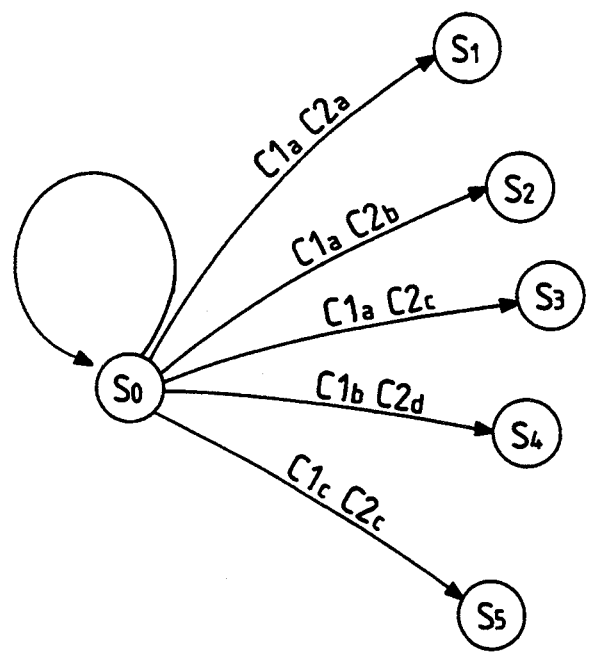
FIG. 8 shows an example of a state having multiple success state transitions.

Before describing the operation of this embodiment, the basic concept of the displacement numbers will be described referring to the example of FIG. 8. In FIG. 8, S0 is the source state for transitions to a plurality of success states, S1 to S5, i.e. destination states. The transition success character numbers from the state number S0 to these destination states, each expressed as a pair of converted character number portions, are [C1$a$ C2$a$], [C1$a$ C2$b$], [C1$a$ C2$c$], [C1$b$ C2$d$], [C1$c$ C2$c$] respectively. Thus, in addition to the default state numbers (S0) there are three groups of destination state numbers, i.e. a group having three members (S1, S2, S3), and two groups each having one member (S4, S5). Within each of these groups, the transition characters all have the same value of first converted character number portion C1. The transitions to these three groups of destination state numbers and the default transition (back to state number S0) can thus be expressed by respective numbers in the range from 0 to 3. These are shown in binary form in Table 2 below, in which C1$_x$ denotes "any other value of C1", and constitute the respective possible 1st displacement numbers, for transitions from the state S0.

TABLE 2

| First converted character number portion | 1st displacement number |
|---|---|
| C1$_x$ | 00 |
| C1$_a$ | 01 |
| C1$_b$ | 10 |
| C1$_c$ | 11 |

The meaning of the term "number of bits of the 1st displacement number", as applied to the present embodiment, is the minimum number of bits (extending from the LSB, up to the highest order '1' bit) necessary to express all of the possible values of 1st displacement number of a state. The "number of bits of the 2nd displacement number" is similarly defined.

Figure 9:
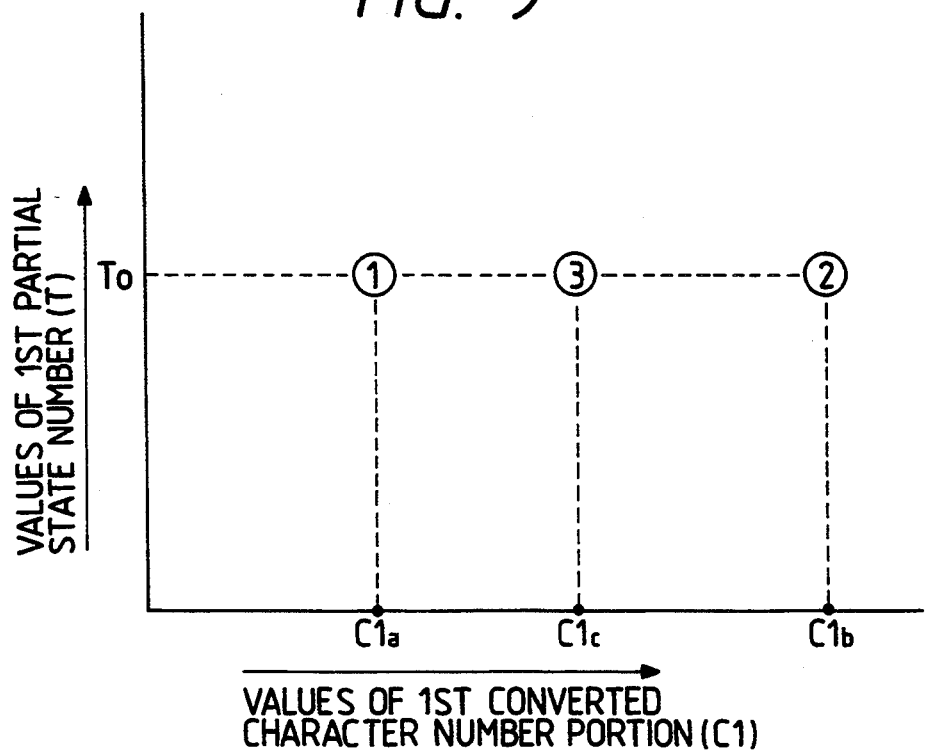
FIG. 9 is a diagram to illustrate how respective values of 1st displacement number are derived, for the example of FIG. 8, by the first embodiment.

The 1st displacement number table memory 104$a$ and 2nd displacement number table memory 105$a$ can each be considered as a 2-dimensional table. In the 1st displacement number table memory 104$a$, the set of high-order address bits (T) derived from the current state number selects one row of that table, (i.e. in this embodiment, one set of 7-bit words containing respective 1st displacement numbers) as illustrated in FIG. 9. The remaining low-order address bits (i.e. the first converted character number portion (C1) of the input character) select one entry from that row. With the example of FIG. 8, an entry having the value 1, 2, or 3 is selected.

Thus for example, if S0 becomes the current state number during a text search, and if the first converted character number portion of the input character at that time is C1$_a$, then the 7-bit word which is read out from the 1st displacement number table memory 104$a$ will be [0000001], while the 3-bit word which is read out from the 1st displacement bit number table memory 104$b$ will be [010].

The "number of bits of the 2nd displacement number" is similarly expressed. In FIG. 8, there are four possible values for the second converted character number portion of each transition character C2 with respect to state number S0, so that "number of bits of 2nd displacement number" will be 3. The table of 2nd displacement numbers for S0 is shown in Table 3 below.

TABLE 3

| Second converted character number portion | 2nd displacement number |
|---|---|
| C2$_y$ | 000 |
| C2$_a$ | 001 |
| C2$_b$ | 010 |
| C2$_c$ | 011 |
| C2$_d$ | 100 |

Thus, the relationships between all possible next states from the state S0, and the first and second converted character number portions C1, C2 of the transition characters of S0 can be expressed in the form of a 2-dimensional state table, as shown by the following Table 4.

TABLE 4

| | | First converted character number portion | | | |
|---|---|---|---|---|---|
| | | C1$_a$ | C1$_b$ | C1$_c$ | C1$_x$ |
| Second | C2$_a$ | S1 | S0 | S0 | S0 |
| converted | C2$_b$ | S2 | S0 | S0 | S0 |
| character | C2$_c$ | S3 | S0 | S5 | S0 |
| number | C2$_d$ | S0 | S4 | S0 | S0 |
| portion | C2$_y$ | S0 | S0 | S0 | S0 |

With the present invention, during a text search, each address of a next state number in the state number table memory is obtained by adding to a base number (which is specific to the current state number) a combination of the 1st and 2nd displacement numbers. In this example the first converted character number portion (C1) can take 4 different values, and the second converted character number portion (C2) can take 5 different values, i.e. providing 20 possible combinations of these values. Thus it is only necessary to use 20 words of the state number table memory 106 to store all of the possible next state numbers for the state number S0.

The base number for a state (assigned during the initialization procedure) must be a 15-bit binary number which has not been assigned to any other state, and which has a number of low-order '0' bits (i.e. extending continuously from and including the LSB) that is at least equal to the sum of the two values "number of bits of the first displacement number" and "number of bits of the second displacement number", which have been established for that state as described above. During a text search, each time a new set of values for the current state number and input character number are produced and corresponding words are read out from table memory 103 and table memory sections 104, 105, the following operations are successively performed, designating the values of "number of bits of 1st displacement number" and "number of bits of 2nd displacement number" read out from table memories 104b, 105b as N and M respectively:

(a) A low-order set of N bits is extracted from the 7-bit word read out from the table memory 104a, as the 1st displacement number;

(b) A low-order set of M bits is extracted from the 7-bit word read out from the table memory 105a, as the 2nd displacement number;

(c) The 2nd displacement number is multiplied by the factor $2^N$, and the result added to the 1st displacement number;

(c) The result is added to the 15-bit base number which is read out from the table memory 103.

(d) The result is set in the state number address register 109, as the address of the next state number.

Thus, referring to FIG. 8, the address in the state number table memory 106 for S1 as the next state number from S0, designating the base number of state S0 as B0, would be (B0+4 * 1+1), i.e. (B0+5).

Figure 10:
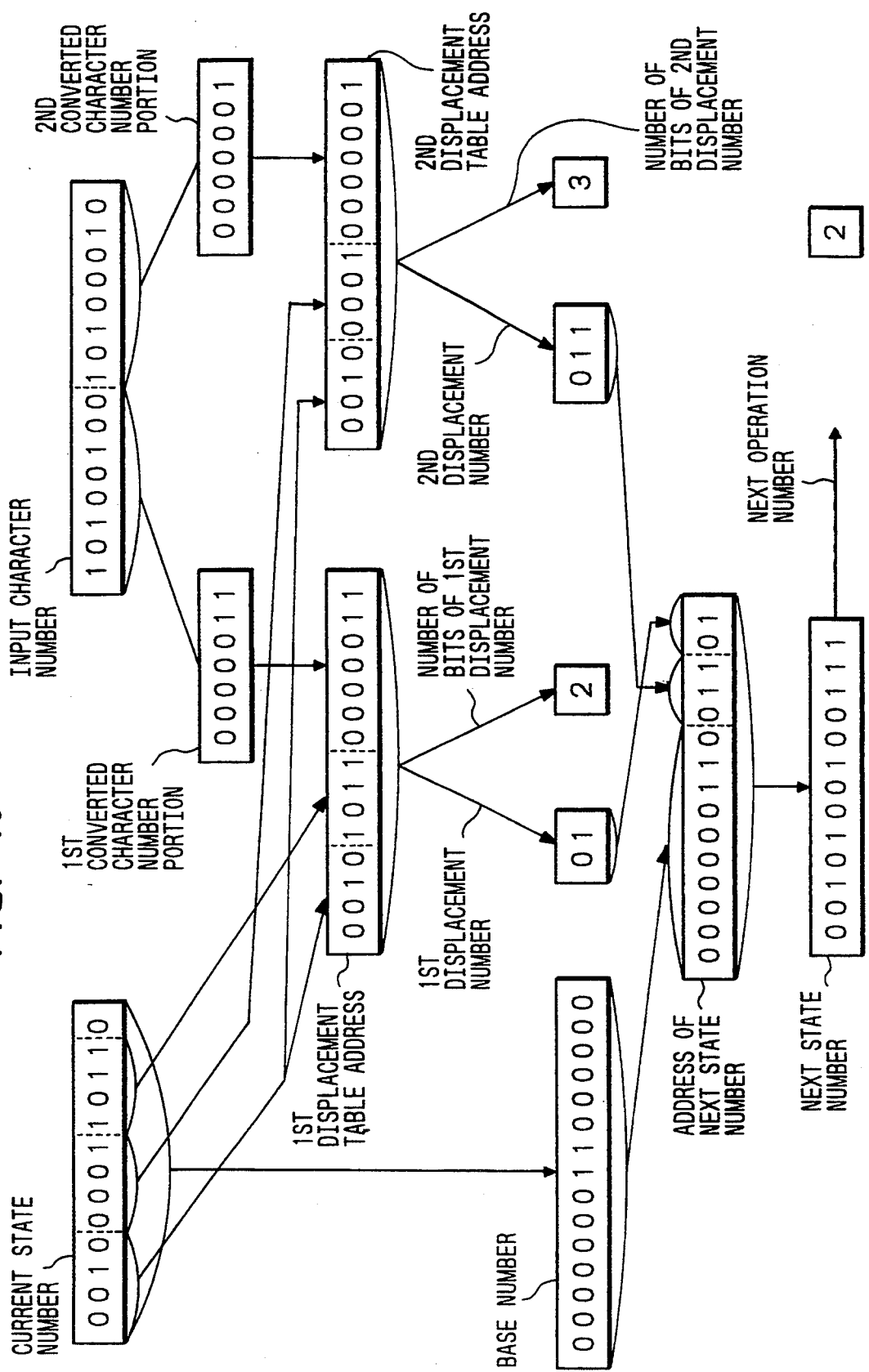
FIG. 10 is a processing sequence diagram to illustrate processing of specific values of current state number and input character number, to obtain an address of the next state number, by the first embodiment.

The operation of this embodiment during a text search can be understood from FIG. 10, which shows an example of a specific combination of a current state number and input character number, with all values being expressed as binary numbers. The apparatus of FIG. 5 is assumed to be operating in a condition in which the current state number is [0010000110110], and the first and second converted character number portions produced from the character number conversion section 102 are [0000011] and [0000001] respectively. It is also assumed that the base number which is read out from the base number table memory 103 in response to the current state number (supplied as an address input thereto) is [000000011000000]. The first partial state number (T), obtained from the current state number as described hereinabove, is therefore [00101011], and the second partial state number (U) is [00100001]. In response to the first partial state number being applied as the address for the 1st displacement bit number table memory 104b, the corresponding "number of bits of 1st displacement number" is assumed to be obtained as [010], i.e. 2. The address supplied to the 1st displacement number table memory 104a, by combining the first converted character number portion and first partial state number, is [001010110000011]It is assumed that, in response to that address, the 7-bit word [0000001] is read out from table memory 104a, and since the "number of bits of 1st displacement number" is 2, the 1st displacement number is shown in FIG. 10 as [01].

It is further assumed that in response to the address [001000010000001] (obtained by combining the second partial state number and the second converted character number portion as illustrated), the 7-bit 2nd displacement number word [0000011] is obtained from the table memory 105a. Since the "number of bits of 2nd displacement number" is 3, the 2nd displacement number is obtained as [011].

The state number address generating section 107 then adds together the base number, the 1st displacement number, and a combined displacement number obtained by multiplying the 2nd displacement number by $2^2$ to thereby obtain the address within the state number table memory 106 of the next state number, as [000000011001101]. That address value is then set into the state number address register 109, to be supplied to the state number table memory 106 in the succeeding character examination interval. It is assumed that the next state number which is thereby read out from the state number table memory 106 is [0010100100111].

The above operations are then repeated, using the converted character number portions obtained from the succeeding character in conjunction with that next state number.

As mentioned hereinabove, it is an advantageous feature of the above embodiment that respectively different 8-bit portions are extracted from the current state number, to be used in the 1st and 2nd table addresses as the 1st and 2nd partial state numbers. That advantage can be illustrated by a specific numeric example. In the example of FIG. 10, there are 32 different possible state number values having the same set of 8 high-order bits [00100001] as the state number [0010000110110]. Instead of selecting different sets of bits as the partial state numbers T, U, it would be possible to use only one set, e.g. the 8 high-order bits, as the partial state number. In that case, assuming for example that the current state number is [0010000100011], then the respective values of 1st and 2nd displacement numbers obtained from the displacement number memories would be the same as those shown in FIG. 10, i.e. 1 and 3, and the numbers of bits would similarly be the same, i.e. 2 and 3. If it assumed that the base number obtained in response to that current state number is [000001001000000], then the "address of next state number" in that case would be [000001001001101]. Thus, the low-order five bits of the address would be identical to those in the address generated for the current state number example of FIG. 10.

Alternatively stated, in that case, each of the state numbers having an identical set of 8 high-order bits will be limited to addressing, in common, the same region of the 1st displacement number table memory and the same region of the 2nd displacement number table memory.

However by selecting respectively different portions (T, U) of the current state number for use in the 1st and 2nd table addresses, it becomes possible for such different values of state number to address respectively different regions of the 1st and 2nd displacement number table memories. In the above example, the 1st and 2nd partial state numbers (T, U) obtained for the current state number [0010000100011] will be [00100001] and [00100001], so that the partial state number T is different from that of the example of FIG. 10. Hence, although the same region of the 2nd displacement number table memory will be addressed by the current state numbers [0010000110110] and [0010000100011], respectively different regions of the 1st displacement number table memory will be addressed by these, and so respectively different values of 1st displacement number and number of bits of 1st displacement number can be obtained.

Figure 7:
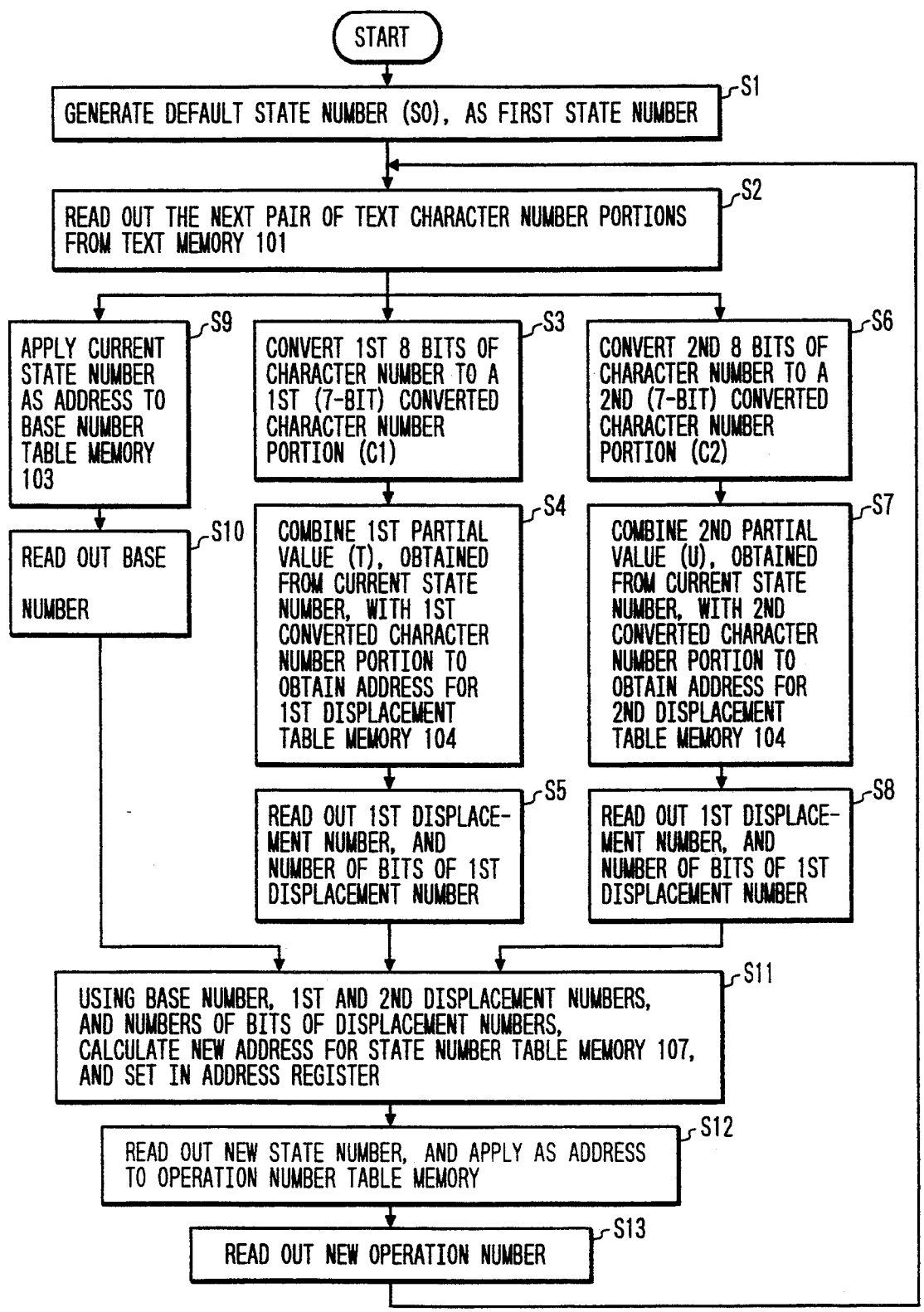
FIG. 7 is a flow diagram to illustrate the processing operation sequence of the embodiment of FIG. 5 during a text search.

FIG. 7 is a flow diagram to illustrate the operating sequence of this embodiment. Operating steps for terminating the sequence (e.g. a step of judging whether the final character number of the text has been examined)

are omitted from FIG. 7, since these conditions will vary in accordance with the particular type of search.

For any source state S0, the addresses in the state number table memory 106 of all of the next state numbers from that source state are located within a continuous sequence of values (B0), (B0+1), (B0+2), and so on, where B0 is the base number used for state S0. That minimum number of words, designated as V, is expressed as:

$$V = 2(N*(1+K))$$

In the above, N denotes the number of bits of 1st displacement number, and K denotes the maximum value of the 2nd displacement number.

In many cases, not all of the above-mentioned continuous sequence of state number table addresses will actually be necessary for storing the next states of S0, and so some of these may be available for storing next state numbers of other source states. For example, if N is 3 and K is 2, then the value of V is 24. The corresponding sequence of 24 addresses in the state number table memory 106, designating the base number of the source state as B0, extends from B0 to (B0+24−1), i.e. to (B0+23). However the address values (B0+5), (B0+6), (B0+13) to (B0+15), and (B0+21) to (B0+23) are not used, and so it may be possible to use some of these addresses to store "next state number" values of other states.

As can be understood from the above description, a text search apparatus according to the present invention has a two-level memory structure, in which a first level (base and displacement table memories) derives an address for the next state number based on the current state and the character which is currently being examined, and that address is then supplied to a second level (the state number table memory). The basic features and advantages of the embodiment described above are as follows:

(a) In the embodiment, to minimize storage capacity requirements, each of the 8-bit portions of an EUC code input character number is converted to a 7-bit value, which is based on 0.

(b) Rather than using all of the bits of the converted (14 bit) character number thus obtained, in conjunction with the current state number, to obtain an address of a state number table memory, a converted portion (C1) of the character number is combined with a first portion (T) of the current state number, to obtain an address for a 1st displacement number table memory, from which a corresponding 1st displacement number is read out. Similarly, a second converted portion (C2) of the character number is combined with a second portion (U) of the current state number, to obtain an address for a 2nd displacement number table memory, from which a corresponding 2nd displacement number is read out. In addition, the current state number is applied to a table memory from which a corresponding base number is read out. The total memory capacity required for these three table memories is small, for the following reasons. Firstly, the maximum number of entries stored in two table memories each having (7+8)=15 address lines and a table memory having 13 address lines is very much smaller (approximately 70 thousand entries) than the number of entries stored in a single table memory having (14+13)=27 address lines (over 120 million entries). Secondly, the maximum values of the displacement numbers are small so that the word length used in the displacement number table memories can be small (e.g. 7 bits).

(c) Using the base number and the 1st and 2nd displacement numbers thus obtained from the current state number and the current input character number, an address for the next state number is obtained by adding to the base number a combination of the 1st and 2nd displacement numbers. More specifically, if in the current state of search there are n possible values for the 1st displacement number and m possible values for the 2nd displacement number, then there are (m * n) possible values for that amount which is added to the base number to obtain the address of the next state number, i.e. (m , n) different words of the state number table memory can be selected. The state number table memory is thus a 1-dimensional table memory, having only a small number of words.

(d) In general, there will only be a small number (one or two) success transition states from the current state. With the prior art apparatus of FIG. 1 it is necessary to store respectively different entries, (in the part of the state number table memory relating to that current state) for each character which is not one of the success transition characters. However with the present invention, if a default transition character number with respect to the current state is inputted, then in general, respective fixed values of the 1st and 2nd displacement numbers are produced, irrespective of the input character number. Thus, for each state, it is in general only necessary to provide a small number of entries in the state number table memory to cover all of these default character numbers. The memory capacity requirements for the state number table memory (i.e. memory 106 in the embodiment) can thereby be very substantially reduced. Thus, the invention enables the size of the state number table memory to be very substantially condensed. Moreover as described above, only a small amount of memory capacity is required for the base number and displacement number table memories.

Thus, the invention enables the overall amount of memory capacity required for a finite state automaton full-text search apparatus to be very substantially reduced by comparison with the prior art. Furthermore, that reduction is achieved without any penalty of decreased speed of searching, such as results with prior art types of finite state automaton full-text search apparatus as discussed hereinabove.

Figure 11:
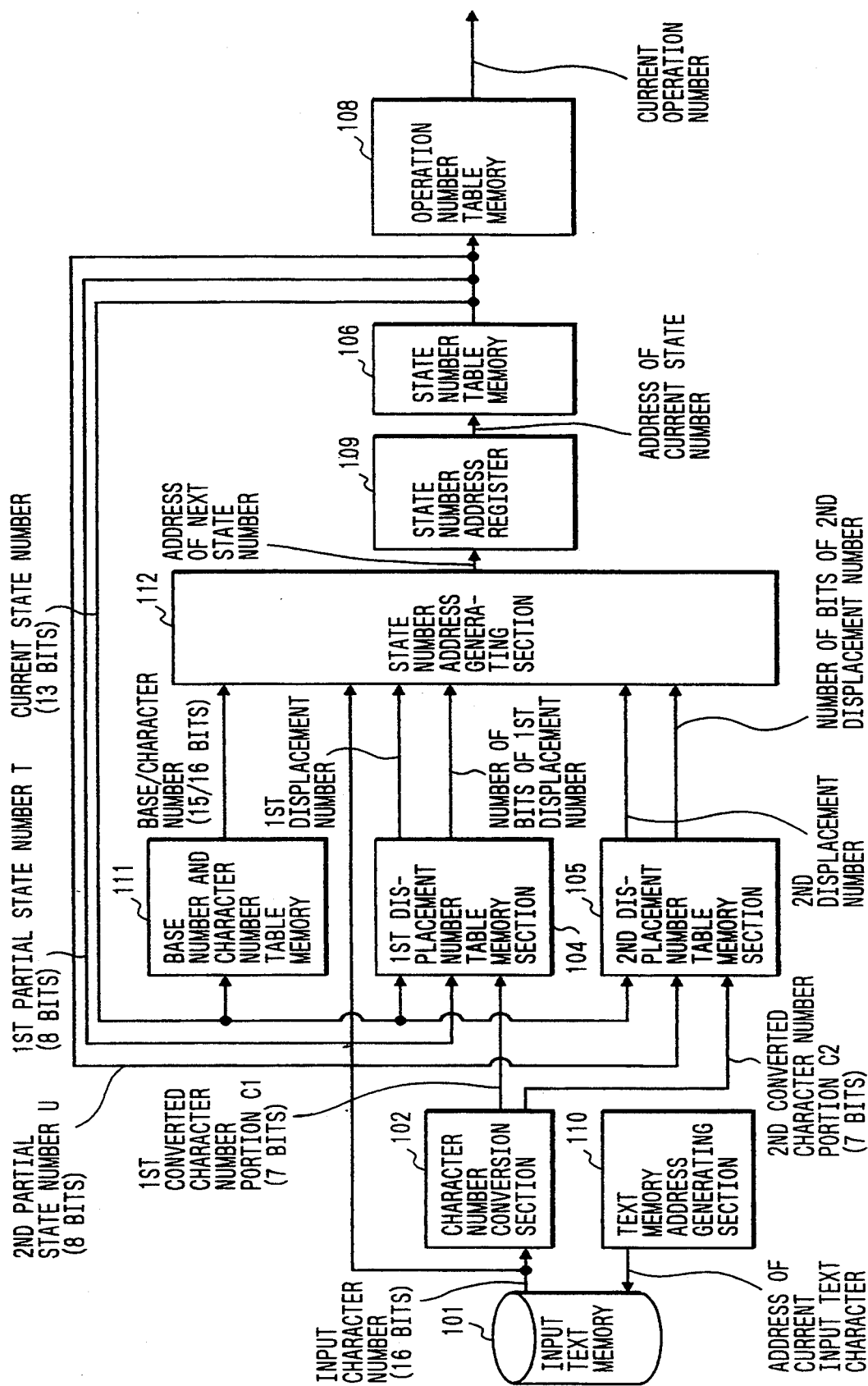
FIG. 11 is a general block diagram of a second embodiment of a FSA text search apparatus according to the present invention.

A second embodiment of the invention will be described, which includes the concepts of the first embodiment, but which enables a further reduction to be achieved in the overall amount of memory capacity required. FIG. 11 is a general block diagram of this embodiment. As shown, this differs from the first embodiment in that a base number and character number table memory 111 is used in place of the base number table memory 103, and in that the input character number is supplied (together with the base number, 1st and 2nd displacement numbers, and number of bits of 1st displacement number) to a state number address generating section 112, which generates each next state address value. In this embodiment the first and second partial state numbers (T, U) which are extracted from the current state number each consist 7 bits rather than 8 bits. However apart from the above points, the configurations and operation of the 1st and 2nd displacement number table memories are identical to those of the first embodiment, so that identical reference numerals to those in FIG. 5 have been used in FIG. 11, for blocks having identical functions to those of FIG. 5.

Figure 3:
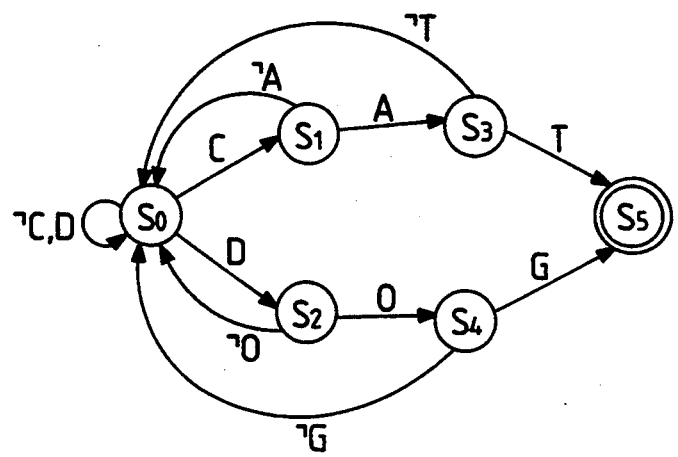
FIG. 3 is an example of a state transition diagram, for describing basic principles of FSA text search operation.

Referring back to FIG. 3, it can be understood that there are some states (S1, S2, S3, S4) for which there are only two possible transitions to a next state, i.e. a success transition or a default transition. With the first embodiment, it is necessary to provide three words in the state number table memory for the default transitions from such a state. With the second embodiment, it is only necessary to provide one entry in the state number table memory for the default transition from such a state, i.e. only two words in the state number table memory are assigned to such a state. (For simplicity of description, it is assumed in this description of embodiments and in the appended claims that there is only a single default state in a text search. However it should be understood that in general it is possible to establish search conditions whereby there are a plurality of default states. In such a case, respective state numbers would be assigned to such default states).

With this embodiment, instead of using a base number table memory as in the first embodiment, a table memory 111 is utilized in which two address ranges are reserved for respectively different purposes. One of these address ranges is used to store base numbers, which are used in the same way as for the first embodiment. The other address range is used to store character numbers. The table memory 111 stores 16-bit words, however only the low-order 15 bits are used for each base number. In the case of a state having only two possible transitions as described above, when the state number of such a state is supplied as an address to the combined base number/character number table memory, the character number for the desired transition character is read out from the table memory. That character number is then compared with the (16 bit) input character number that is currently being supplied from input text memory 101. If they are judged to be identical, then the current state number is used in a calculation to form the address of the desired next state number, which is then supplied to the state number address register 109. If they are not identical (i.e. the condition "any other character" has been found), then a different calculation using the current state number is performed, and the result used to form the address for the next state number, i.e. an address in the state number table memory of the default state number.

Figure 12:
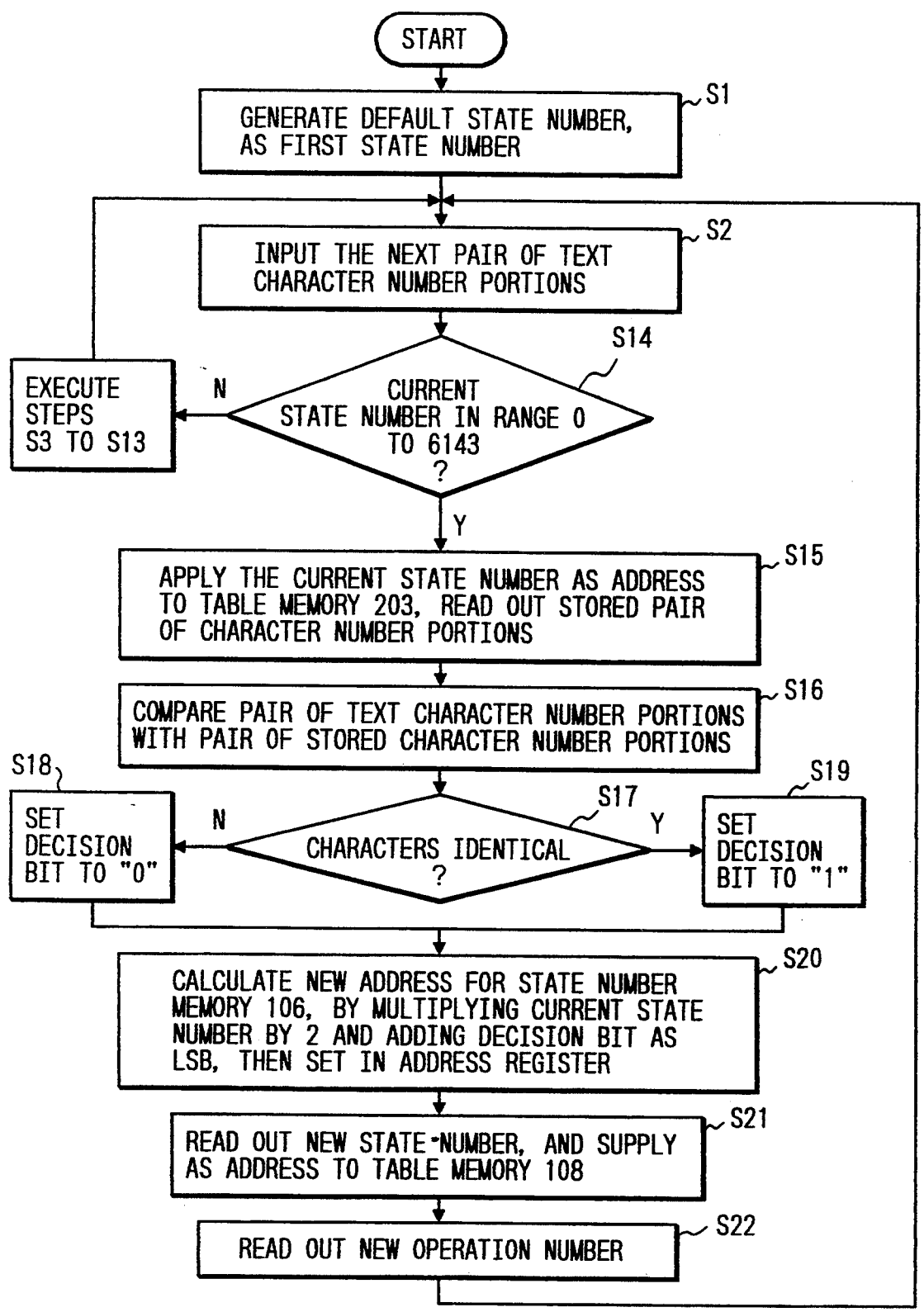
FIG. 12 is a flow diagram to illustrate a mode of operation of the second embodiment, based on comparison of an input character number with a stored character number which is read out in accordance with the current state number.
Figure 13:
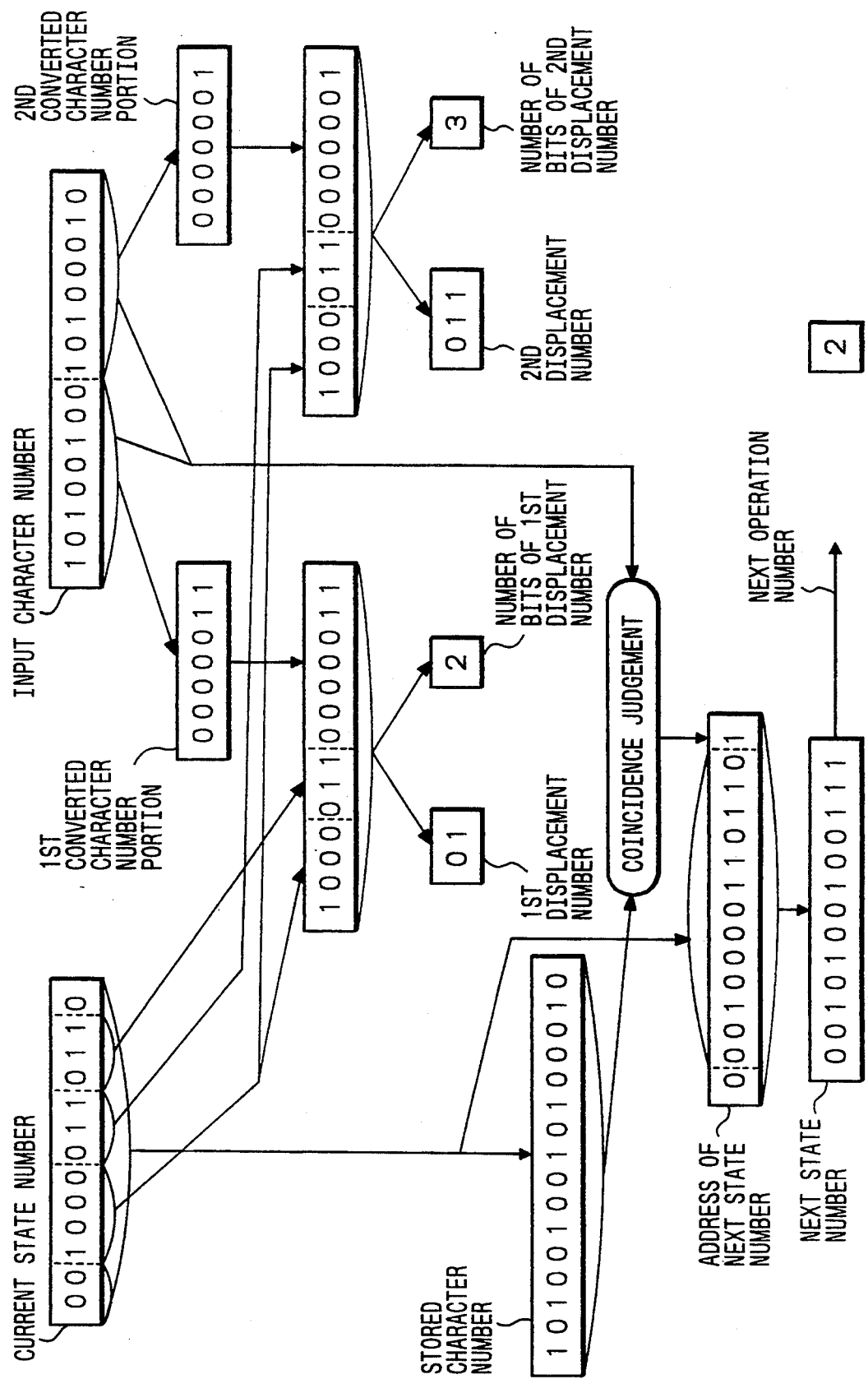
FIG. 13 is a processing sequence diagram to illustrate processing of specific values of current state number and input character number, to obtain an address of the next state number, by the comparison operation mode of the second embodiment.

The operating sequence of this embodiment is shown in FIG. 12, and the operation will be described referring to FIGS. 11, 12 and to the example of specific numeric values shown in FIG. 13. As for the first embodiment, the text characters are stored in the input text memory 101, and the respective contents of the table memories 111, 104 and 105, and the state number table memory 106 and operation number table memory 108 are initialized in accordance with the search conditions, prior to executing a text search. It will be assumed that step S1 has been previously executed, that the current state number shown in FIG. 13 is being read out from the state number table memory 106, i.e. the 13-bit binary number [0010000110110], while a 16-bit character number which is being read out from the input text memory 101 under the control of the text memory address generating section 110 is [1010010010100010], in step S2. In this embodiment, of the 8192 addresses of the base number and character number table memory 111, the address range extending from address 6144 up to 8191 is assigned to base numbers, each having 15 bits and values in the range 0 to 32767, while the address range extending from 0 to 6143 is assigned to EUC code character numbers, each having 16 bits and values in the range 0 to 65,535. Thus in step S14 of FIG. 12, a decision is made as to whether the current state number is in the range 0 to 6143. If so, this signifies that the current state number is the address of a character number within the base number and character number table memory 111, so that operation then proceeds to step S15.

If it is found that the current state number is in the range 6144 to 8191, then operation proceeds to step S3 of the flow diagram of FIG. 7, and the steps S3 to S13 of that diagram are then executed, to obtain the address of the next state number in the state number table memory 106. This is performed in the same way as described for the first embodiment above, so that further description will be omitted. However as shown in FIG. 13, in the case of the second embodiment, the address space available for the base numbers in the table memory 111 is smaller than that of the base number table memory 103 of the first embodiment, so that the first partial state number (T) is obtained as bits 1, 2, 3, 7, 8, 9, 10 of the current state number, while the second partial state number (U) is obtained as bits 4, 5, 6, 7, 8, 9, 10 of the current state number. The input character number is converted to two 7-bit portions by the character number conversion section 102, with the high-order 7 bits being combined with the 7 bits of the first partial state number to obtain the address bits for the 1st displacement number memory section 104, and the converted low-order 7 bits of the character number being combined with the second partial state number to obtain the address bits for the 2nd displacement number table memory 105a. Thereafter, the 1st and 2nd displacement numbers are combined with the base number, in the same way as described for the first embodiment, to obtain the address of the next state number in the state number table memory 106.

In the example of FIG. 13, it will be judged in step S14 that the current state number in the range 0 to 6143, so that operation proceeds to step S15 of FIG. 12. That is to say, the value which is read out from the table memory 111 (in response to the current state number applied as an address value) is a 16-bit character number. In FIG. 13, this is assumed to be the same as the input character number that is being read out from the input text memory 101. The stored character number thus read out from table memory 111 is then compared with the input character number, and if they are found to be identical, then (in step S20) that character number is multiplied by 2, and a '1' bit is added to the LSB position of the result, and the resulting 14 bit number (with an additional '0' bit appended as the MSB, to make up a total of 15 bits) is set in the state number address register 109, as the address in the state number table memory 106 of the desired next state number.

If the stored character number and input character number are not found to be identical, then the 13-bit current state number is multiplied by 2, and the result (with an appended '0' MSB, to make up a total of 15 bits) is set into the state number address register 109, as the address of the next state number. In that case, the next state number is the default state number.

In the example of FIG. 13, since the character number which is read out from table memory 111 is identical to the input character number from the input text memory 101, the address that is generated for the next state number, calculated by using the current state number as described above, is [000100001101101]. When the corresponding state number is then read out from the state number table memory 106, and if for example the occurrence of that state number indicates that the final character of a desired string has been found, then a predetermined corresponding operation number (e.g. 2) is read out from the operation number table memory 108 in response to that state number, which can indicate to an external system that a "final success" condition has been reached.

The advantages provided by the present invention can be summarized as follows. In the case of the first embodiment, a table memory (106) used to store state numbers in accordance with predetermined state transition relationships, is a small-scale 1-dimensional table memory having only 15 address lines, although transition relationships between a large number of states (up to 8192) can be expressed by the table memory contents. This is achieved although the input characters are expressed by 16-bit words, and without any loss of text search speed by comparison with a prior art type of FSA text search apparatus full-text search apparatus such as that of FIG. 1, which requires a very much higher total amount of memory capacity.

Figure 1:
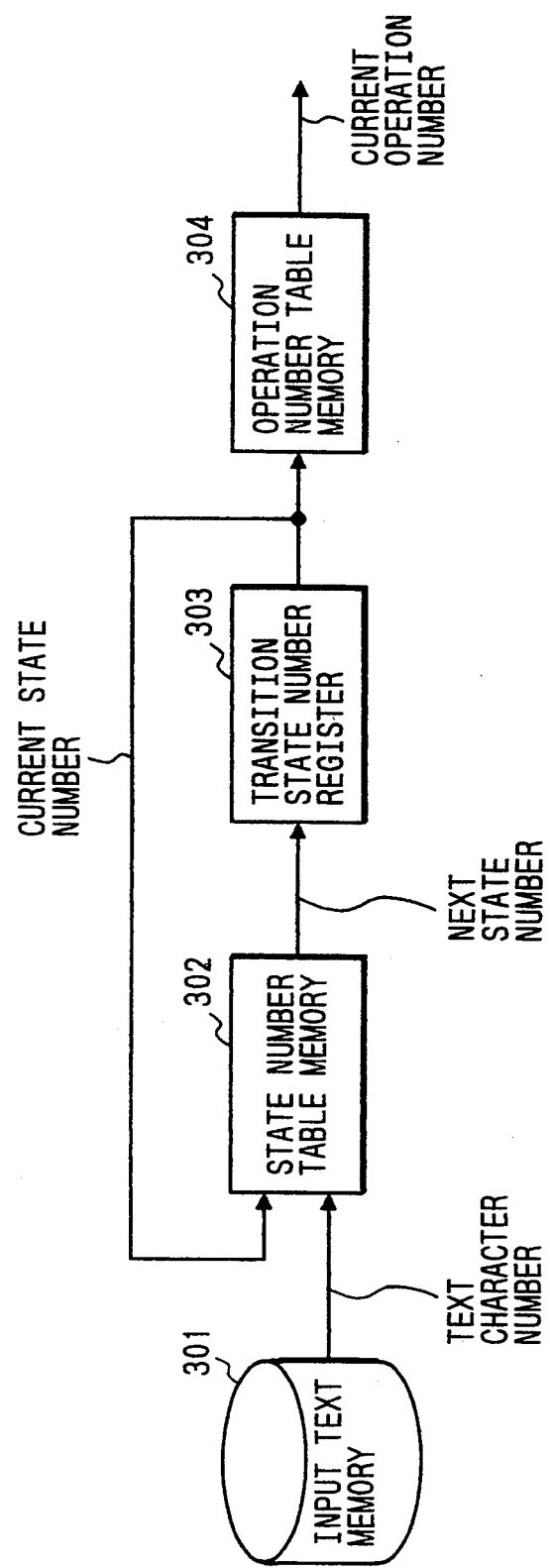
FIG. 1 is a general block diagram of an example of a prior art type of FSA text search apparatus.
Figure 2:
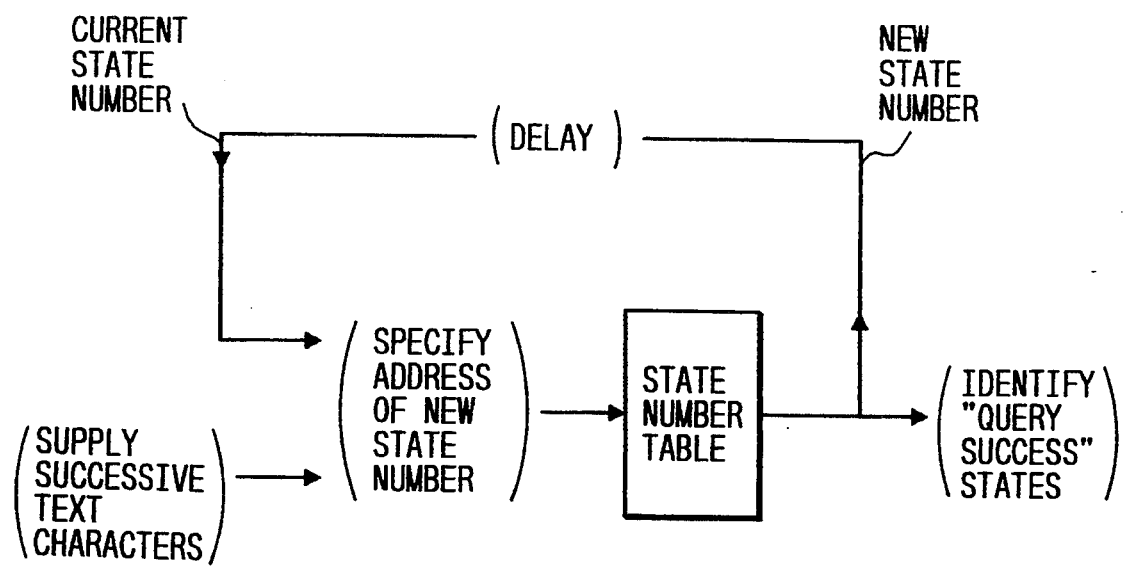
FIG. 2 is a conceptual diagram illustrating the basic operation of the apparatus of FIG. 1.

The present invention achieves that result by eliminating, from the state number table memory 106, almost all of the "default" state numbers which must be stored in the state number table memory of the prior art apparatus of FIG. 1, i.e. the "S0" entries shown in the state number table memory portion of Table 1 above. That is done by handling the higher-significance and lower-significance halves of a character number separately, i.e. by using these in conjunction with respective portions of a current state number to obtain a combination of two displacement number table memories. That combination serves to indicate a particular one of a plurality of possible transitions from the current state. The combination of displacement values is then added to a base number (which is specific to the current state), to thereby obtain an address in the state number table memory of the next state number, i.e. a state number which is the destination of the aforementioned particular one of the transitions from the current state.

The base number is read out from a 1-dimensional table memory, using the current state number as address.

Since as described hereinabove the displacement number table memories and the base number table memory are each small in scale and so require only a small amount of storage capacity, the overall capacity requirements of the embodiment are very substantially less than those of the prior art example of FIG. 1, while avoiding the disadvantage of lowered speed of text searching that is found with prior types of finite state automaton search apparatus which attempt to reduce the memory capacity requirements.

With the first embodiment, if there are only two possible transitions from the current state, then a total of four words must be used in the state number table memory 106 to hold respective next state numbers, for transitions from that current state. With the second embodiment on the other hand, it is only necessary to use two words in the state number table memory 106, for the next states from a current state which has only two possible transitions (one success, one default). Thus the overall memory capacity requirements can be further reduced.

That result is achieved, for such a state which has only two transitions, by storing the success transition character number in a region of the table memory 111, at an address which is identical to the state number of that state. Thus when that state number is read out from memory 106 as the current state number and supplied to the table memory 111, the success transition character number is read out and can then be compared with the input character number. If they are identical, the state number table memory address of the desired next state is then generated, while if they are not identical, then the address of the default state is generated. Thus, only two words are required in the state number table memory. Furthermore, the storage capacity required in the 1st and 2nd displacement number memory sections can be substantially reduced, by using the comparison mode. Specifically, for each state transition that is executed by using the comparison mode to obtain the address of the next state number a total of $\{(2 * 7 * 16384) + (2 * 3 * 128)\} = 230144$ bits of memory capacity can be eliminated, in the 1st and 2nd displacement memory sections, by comparison with the first embodiment. That feature of the second embodiment is therefor especially advantageous in the case of text search applications in which many of the states have only two transitions, enabling a significant reduction in the total amount of memory capacity required.

Although the invention has been described in the above referring to specific embodiments, it will be understood that various changes to these embodiments could be envisaged, which fall within the scope claimed for the present invention. For example although the embodiments are each applied to the EUC code numbers for expressing Japanese characters by 16 bits, which are reduced to two sets of 7 bits, the invention is equally applicable to various other language code standards, for which such bit reduction may not be applicable.

Furthermore, although with the embodiments each input character number is divided into two parts, for use in deriving corresponding displacement numbers in conjunction with the current state number, the invention could equally be used by operating on successive pairs of input character numbers (e.g. pairs of 8-bit bytes).

In the embodiments of the invention described hereinabove, each address of a next state number, calculated by the state number address generating section 107, is held in a register until the next input character number is to be examined, and is then supplied from the register to the state number table memory 106. However it would of course be equally possible to supply each address from the state number address register 109 directly to the state number table memory 106, and to temporarily hold a register the state number thereby read out from the table memory 106.

What is claimed is:

1. A finite state automaton text search apparatus, responsive to sequentially supplied input character numbers expressing successive characters of a text for executing a search of said text in accordance with predetermined search conditions, each of said input character numbers being a binary number comprising a fixed number of bits, said search apparatus comprising:

state number table memory means (106) having stored therein a plurality of state numbers, at locations having respective addresses predetermined in accordance with said search conditions, and for selectively outputting one of said state numbers as a current state number in response to a current address value supplied thereto;

character number conversion means (102) for converting a currently supplied one of said input character numbers into first and second character number portions (C1, C2);

state number address derivation means (103, 104, 105, 107) including means for storing a predetermined set of 1st displacement numbers, a predetermined set of 2nd displacement numbers and a predetermined set of base numbers, and means for deriving a combination of said first input character number portion (C1) with a first portion (T) of said current state number, and selecting one of said set of 1st displacement numbers, in accordance with said combination, deriving a combination of said second character number portion (C2) and a second portion (U) of said current state number, and selecting one of said predetermined set of 2nd displacement numbers, in accordance with said combination, selecting one of said predetermined set of base numbers in accordance with said current state number, combining said selected 1st and 2nd displacement numbers to form a combined displacement number, and adding said combined displacement number to said selected base number to obtain an address in said state number table memory means of a next state number; and address register means (109) for supplying said current address to said state number table memory means, coupled to receive said address of the next state number, and for supplying said address of the next state number as said current address to said state number table memory means when a next one of said input character numbers is received by said search apparatus.

2. The search apparatus according to claim 1, wherein each of said state numbers, base numbers and displacement numbers is a binary number, and wherein said address derivation means comprises:

base number table memory means (103) having stored therein a plurality of said base numbers at respective addresses determined in accordance with said search conditions, and responsive to said current state number for reading out a corresponding base number;

1st displacement number table memory means (104a) having stored therein a set of 1st displacement number words expressing respective ones of a set of variable-range 1st displacement numbers, responsive to a combination of said first portion (T) of the current state number and said first portion of the input character number for reading out one of said 1st displacement number words;

1st displacement bit number table memory means (104b) having stored therein a set of 1st displacement bit numbers, expressing respective values of range of said 1st displacement numbers, responsive to said first portion (T) of the current state number for reading out one of said 1st displacement bit numbers;

second displacement number table memory means (105a) having stored therein a set of 2nd displacement number words expressing respective ones of a set of variable-range 2nd displacement numbers, responsive to a combination of said second portion (U) of the current state number and said second portion of the input character number for reading out one of said 2nd displacement number words;

2nd displacement bit number table memory means (104b) having stored therein a plurality of 2nd displacement bit numbers expressing respective values of range of said 2nd displacement numbers, responsive to said second portion (U) of the current state number for reading out one of said 2nd displacement bit numbers; and address generating means (107) coupled to receive said 1st and 2nd displacement number words and 1st and 2nd displacement bit numbers read out from said 1st and 2nd displacement number table memories and 1st and 2nd displacement bit number table memories respectively, for extracting a 1st displacement number from said 1st displacement number word as a set of bits equal in number to said 1st displacement bit number, for extracting a 2nd displacement number from said 2nd displacement number word, as a set of bits equal in number to said 2nd displacement bit number, for multiplying said 2nd displacement number by an amount $2^n$ where "n" signifies said 1st bit number and adding a result obtained thereby to said 1st displacement number to obtain said combined displacement number, and for adding said combined displacement number to said base number to obtain said address of the next state number.

3. The search apparatus according to claim 2 wherein said base number table memory means is responsive to state number values supplied as addresses thereto, which are within a first predetermined range, for reading out corresponding ones of said base numbers, and wherein said current state number address generating means further comprises:

character number table memory means holding a set of stored character numbers, each of said stored character numbers being a success transition character number with respect to a specific corresponding state number and being stored in said character number table memory means at a location having an address which is identical to said specific corresponding state number, each said specific corresponding state number being within a second predetermined range which is different from said first predetermined range, said character number table memory means being responsive to said current state number, supplied as an address value thereto, when said current state number is within said second predetermined range of values, for reading out a corresponding one of said stored character numbers;

comparison means for executing an identity comparison between said corresponding one of the stored character numbers with said current input character number, and for generating a comparison output value selectively indicating whether an identity condition has been detected;

calculation means for operating on said corresponding current state number in conjunction with said comparison output value to derive said address in the state number table memory means of said next state number; and judgement means for judging whether said current state number is within said first and second predetermined ranges of values, and means controlled by said judgement means for supplying to said address register means said address derived by adding said combined displacement number to said selected base number when said current state number is within said first range of values, and for supplying to said address register means said address derived by operating on said current state number in conjunction with said comparison output value, when said current state number is within said second range of values.

4. The search apparatus according to claim 3, wherein said calculation means comprises means responsive to said comparison output value for:

multiplying said current state number by two, and when said identity condition has been detected, setting the least significant bit of a result of said multiplication to the logic '1' state, to obtain as a result said address of the next state number, and when said identity condition has not been detected, outputting said result of the multiplication unchanged, as said address of the next state number.

5. The search apparatus according to claim 1, wherein each of said input character numbers received by said search apparatus comprises first and second binary code values, each of said binary code values expressing a number within a fixed range of values which extend from a value higher than zero, and wherein said character number conversion means converts said first and second binary code values of an input character number to respective first and second converted code values (C1, C2) and supplies said converted code values to said address derivation means as said first and second character number portions respectively, each of said converted code values being within a range of values extending continuously from zero, and said first and second converted code values comprising respectively smaller numbers of bits than said first and second binary code values of an input character number.

6. The search apparatus according to claim 1, further comprising operation number table memory means (108) having stored therein a plurality of operation numbers respectively predetermined as representing respective statuses of said search, said operation numbers stored at respective addresses predetermined in accordance with said search conditions, said operation number table memory means being responsive to said current state number for reading out a corresponding one of said operation numbers.

7. A finite state automaton text search apparatus for searching a text in accordance with predetermined search conditions, coupled to receive successive input character numbers expressing respective characters of said text, comprising:

state number table memory means (106) having stored therein a plurality of state numbers, at respective locations having addresses determined in accordance with said search conditions;

means (102) for separating an input character number into first and second input character number portions;

base number and character number table memory means (111) for storing a predetermined set of 1st displacement numbers, a predetermined set of 2nd displacement numbers, a predetermined set of base numbers held at respective locations having addresses within a first address range and a plurality of stored character numbers held at respective locations having addresses within a second address range, each of said stored character numbers being a success transition character number with respect to a specific state number, and being held in said base number and character number table memory means at a location having an address which is identical to said specific state number;

first state number address derivation means for deriving an address of a next state number in said state number table memory means in accordance with a current one of said input character numbers and a base number read out from said base number and character number table memory means when said current state number is within said first address range, and second state number address derivation means for deriving said address of a next state number in accordance with a combination of said current input character number, said current state number, and a character number read out from said base number and character number table memory means, when said current state number is within said second address range; and address register means (109) coupled to receive said address of the next state number, for supplying said address to said state number table memory means when a succeeding one of said input characters is supplied to said apparatus.

8. The search apparatus according to claim 7, wherein said first state number address derivation means comprises means for:

operating on said first character number portion in conjunction with a first portion of a said current state number, to obtain an address of one of said stored set of 1st displacement numbers, and reading out said one of the 1st displacement numbers from said base number and character number table memory means operating on said second character number portion in conjunction with a second portion of said current state number, to obtain an address of one of said stored set of 2nd displacement numbers, and reading out said one of the 2nd displacement numbers from said base number and character number table memory means, and combining said ones of the 1st and 2nd displacement numbers to form a combined displacement number, and adding said combined displacement number to said base number to obtain said address of the next state number;

and wherein said second state number address derivation means comprises means for reading out one of said stored character numbers from said base number and character number table memory means in response to said current state number and for comparing said input character number with said one of the stored character numbers, and responsive to a result of said comparison for generating, as said address of the next state number a state number memory table address of a state number corresponding to a success transition from said current state number when said stored character number and input character number are identical, and for otherwise generating a state number table memory means address of a default state number as said address of the next state number.

9. The search apparatus according to claim 7, wherein each of said state numbers, character numbers, base numbers and displacement numbers is a binary number, and wherein said first state number address derivation means comprises:

said character number and base number table memory means (111), having stored therein a plurality of said base numbers at respective addresses determined in accordance with said search conditions, and responsive to said current state number for reading out a corresponding base number;

1st displacement number table memory means (104a) having stored therein a plurality of 1st displacement number words expressing respective variable-range 1st displacement numbers, responsive to said first portion (T) of said current state number in combination with said first portion of the input character number for reading out one of said 1st displacement number words;

1st displacement bit number table memory means (104b) having stored therein values of 1st displacement bit number expressing respective values of range of said 1st displacement numbers, responsive to said current state number for reading out one of said values of 1st displacement bit number;

2nd displacement number table memory means (105a) having stored therein a plurality of 2nd displacement number words expressing respective variable-range 2nd displacement numbers, responsive to said second portion (U) of the current state number in combination with to said second portion of the input character number for reading out one of said 2nd displacement number words;

2nd displacement bit number table memory means (105b) having stored therein a plurality of values of 2nd displacement bit number expressing respective values of range of said 2nd displacement numbers, responsive to said current state number for reading out one of said values of 2nd displacement bit number; and address generating means (107) coupled to receive said 1st and 2nd displacement number words and 1st and 2nd displacement bit number values read out from said 1st and 2nd displacement number table memories and 1st and 2nd displacement bit number table memories respectively, for extracting a 1st displacement number from said 1st displacement number word, as a set of bits equal in number to said 1st displacement bit number value, for extracting a 2nd displacement number from said 2nd displacement number word, as a set of bits equal in number to said 2nd displacement bit number value, for multiplying said 2nd displacement number by an amount $2^n$ where "n" signifies said 1st bit number value and adding a result obtained thereby to said 1st displacement number to obtain said combined displacement number, and for adding said combined displacement number to said base number to obtain said address of the next state number.

10. The search apparatus according to claim 7, wherein each of said input character numbers received by said search apparatus is formed of 1st and 2nd binary code values, each of said binary code values expressing a number within a range of values which extend from a value higher than zero, and wherein said character number conversion means (102) converts said 1st and 2nd binary code values of an input character number to respective converted code values (C1, C2) and supplies said converted code values to said first state number address derivation means as said first and second character number portions respectively, each of said converted code values being within a range of values extending continuously from zero, said 1st and 2nd converted code values comprising respectively smaller numbers of bits than said 1st and 2nd binary code values of said input character number.

11. The search apparatus according to claim 7, further comprising operation number table memory means (108) having stored therein a plurality of operation numbers respectively predetermined as representing respective statuses of said search, said operation numbers being stored at respective addresses predetermined in accordance with said search conditions, said operation number table memory means being responsive to said current state number for reading out a corresponding one of said operation numbers.

* * * * *